United States Patent
Lin et al.

(10) Patent No.: US 9,010,979 B2
(45) Date of Patent: Apr. 21, 2015

(54) COMPOSITE OPTICAL FILM AND BACKLIGHT MODULE USING THE SAME

(75) Inventors: Yi-Wen Lin, Hsin-Chu (TW); Jen-Yuan Chi, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 75 days.

(21) Appl. No.: 13/612,873

(22) Filed: Sep. 13, 2012

(65) Prior Publication Data

US 2013/0121021 A1    May 16, 2013

(30) Foreign Application Priority Data

Nov. 16, 2011   (TW) .............................. 100141762 A

(51) Int. Cl.
*F21V 7/04* (2006.01)
*G02B 5/02* (2006.01)

(52) U.S. Cl.
CPC ............ *G02B 5/0215* (2013.01); *G02B 5/0242* (2013.01); *G02B 5/0278* (2013.01)

(58) Field of Classification Search
USPC ............... 362/611, 612, 616, 618, 97.1–97.4, 362/606–607, 627; 349/61–65
See application file for complete search history.

(56) References Cited

U.S. PATENT DOCUMENTS

| | | | |
|---|---|---|---|
| 6,606,133 B1 | 8/2003 | Okabe | |
| 7,637,645 B2 * | 12/2009 | Hsu et al. ...................... | 362/606 |
| 2006/0290253 A1 * | 12/2006 | Yeo et al. ...................... | 313/116 |
| 2007/0025121 A1 * | 2/2007 | Harada et al. ................. | 362/607 |
| 2007/0285588 A1 | 12/2007 | Tsai | |
| 2008/0299348 A1 | 12/2008 | Liu | |
| 2009/0147179 A1 * | 6/2009 | Yamashita et al. ............. | 349/64 |
| 2010/0245717 A1 * | 9/2010 | Miyamoto et al. ............. | 349/65 |
| 2011/0051248 A1 * | 3/2011 | Chi et al. ...................... | 359/599 |

FOREIGN PATENT DOCUMENTS

| | | |
|---|---|---|
| CN | 101639585 A | 2/2010 |
| JP | 10166483 | 6/1998 |
| JP | 2007316616 | 12/2007 |
| KR | 1020090045538 | 5/2009 |
| TW | 200526995 | 8/2005 |
| TW | 200700771 | 1/2007 |
| TW | 200846174 | 12/2008 |
| TW | 200909865 | 3/2009 |
| TW | 200916834 | 4/2009 |
| TW | 200951498 | 12/2009 |
| TW | 201024804 | 7/2010 |
| TW | 201027137 | 7/2010 |
| TW | 201109740 | 3/2011 |

OTHER PUBLICATIONS

Mikhail Polyanskiy, Refractiveindexinfo.com, Nov. 5, 2008, http://refractiveindex.info/?group=CRYSTALS&material=ZnO.*

* cited by examiner

*Primary Examiner* — Jason Moon Han
(74) *Attorney, Agent, or Firm* — Winston Hsu; Scott Margo

(57) ABSTRACT

The present disclosure provides a composite optical film including a brightness enhancement film, a high refractive-index layer, and an intermediate layer. The brightness enhancement film has a plurality of brightness enhancement structures parallel to each other, and a top surface and a bottom surface opposite to each other. The brightness structures are disposed on the top surface. The high refractive-index layer is disposed on the bottom surface, and includes a film and a plurality of inorganic nano-particles disposed within the film. The intermediate layer is disposed between the brightness enhancement film and the high refractive-index layer.

16 Claims, 8 Drawing Sheets

COMPOSITE OPTICAL FILM AND BACKLIGHT MODULE USING THE SAME

BACKGROUND

1. Technical Field

The present disclosure generally relates to a composite optical film and a backlight module using the same, and more specifically to a composite optical film integrating a brightness enhancement film and a diffuser, and a backlight module using the same.

2. Description of the Prior Art

Since Liquid crystal displays (LCD) have the advantages of as slimness, lightness, high brightness, high contrast ratio and low power, they have replaced cathode ray tube displays and became main products in the market. However, LCD panels are passive light-emitting planar display devices, so a backlight module is therefore necessary on the back side of each of the LCD panels to provide light for display.

Please refer to FIG. 1, which schematically depicts a cross-sectional view of a conventional backlight module. As shown in FIG. 1, a conventional backlight module 10 is composed of a light guide plate 12, a plurality of optical films disposed on the light guide plate 12, and a light source 16 disposed at one side of the light guide plate 12. The optical films 14a, 14b, 14c, 14d may include a lower diffuser 14a, a lower brightness enhancement plate 14b, an upper brightness enhancement plate 14c and an upper diffuser 14d sequentially disposed on the light guide plate 12. Light generated by the light source 16 emits into the light guide plate 12 from a sidewall of the light guide plate 12 that is then guided to emit upwards. Thereafter, the light emitting out of the light guide plate 12 passes through the lower diffuser 14a, thereby enabling the light to diffuse uniformly and to be concentrated into a light beam. Then, the light emitting out of the lower diffuser 14a is focused by the lower brightness enhancement plate 14b and the upper brightness enhancement plate 14c and equalized by the upper diffuser 14d, so as to have a luminance-uniform surface light source.

Therefore, the conventional backlight module 10 needs a plurality of optical films 14a, 14b, 14c, 14d to have an ideal back light. Assembling the plurality of optical films 14a, 14b, 14c, 14d will increase the material costs, the assembling process steps, and the assembling time, thereby increasing the processing costs. Besides, optical films 14a, 14b, 14c, 14d may easily rub against each other, leading to scratches or damages that will affect the light emitting brightness of the conventional backlight module 10 and reduce processing yields. Moreover, each of the optical films 14a, 14b, 14c, 14d must have a large enough thickness to keep its physical properties, thereby resulting in limiting the thickness of the conventional backlight module 10.

Therefore, it is an important issue in the industry to decrease the numbers of the optical films in order to reduce the processing costs and reduce the thickness of the backlight module.

SUMMARY

One of the main purposes of the present disclosure is to provide a composite optical film and a backlight module using the same, through integrating a brightness enhancement plate and a diffuser into one optical film.

The embodiment of present invention provides a composite optical film including a brightness enhancement film, a high refractive-index layer, and an intermediate layer. The brightness enhancement film has a plurality of brightness enhancement structures parallel to each other, and a top surface and a bottom surface opposite to each other. The brightness enhancement structures are disposed on the top surface. The high refractive-index layer is disposed on the bottom surface, and includes a film and a plurality of inorganic nano-particles disposed within the film. The intermediate layer is disposed between the brightness enhancement film and the high refractive-index layer.

The embodiment of present invention provides a composite optical film including an intermediate layer, a high refractive-index layer and an interface. The high refractive-index layer has a plurality of inorganic nano-particles, and the high refractive-index layer is disposed on the intermediate layer. The interface is between the intermediate layer and the high refractive-index layer, wherein the interface has a plurality of curved surfaces.

The embodiment of present invention provides a backlight module including a light guide plate, a light source and a composite optical film. The light guide plate has a light entrance surface and a light exit surface and the light source is disposed at a side of the light entrance surface of the light guide plate. The composite optical film is disposed on the light exit surface of the light guide plate, and the composite optical film includes a brightness enhancement film, a high refractive-index layer and an intermediate layer. The brightness enhancement film has a plurality of first brightness enhancement structures parallel to each other, and a top surface and a bottom surface opposite to each other, wherein the first brightness enhancement structures are disposed on the top surface. The high refractive-index layer is disposed on the bottom surface and includes a film and a plurality of inorganic nano-particles disposed within the film. The intermediate layer is disposed between the brightness enhancement film and the high refractive-index layer, wherein light emits into the composite optical film from the high refractive-index layer and emits out of the top surface of the composite optical film.

According to the above, the present disclosure enhances the refractive index of the film up to the first refractive index of the high refractive-index layer by disposing inorganic nano-particles into the film, so that the ratio of the second refractive index of the intermediate layer to the first refractive index of the high refractive-index layer can be adjusted to be the same as the ratio of the refractive index of the air to the refractive index of the lower diffuser of the prior art. This way, the composite optical film of the present invention can not only achieve the optical performance performed by an integration of the brightness enhancement plate and the diffuser, but also save process steps and time in assembling the backlight module. Moreover, the composite optical film of the present invention can prevent scratches and damages between the brightness enhancement plate and the diffuser, and reduce the thickness of the backlight module.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
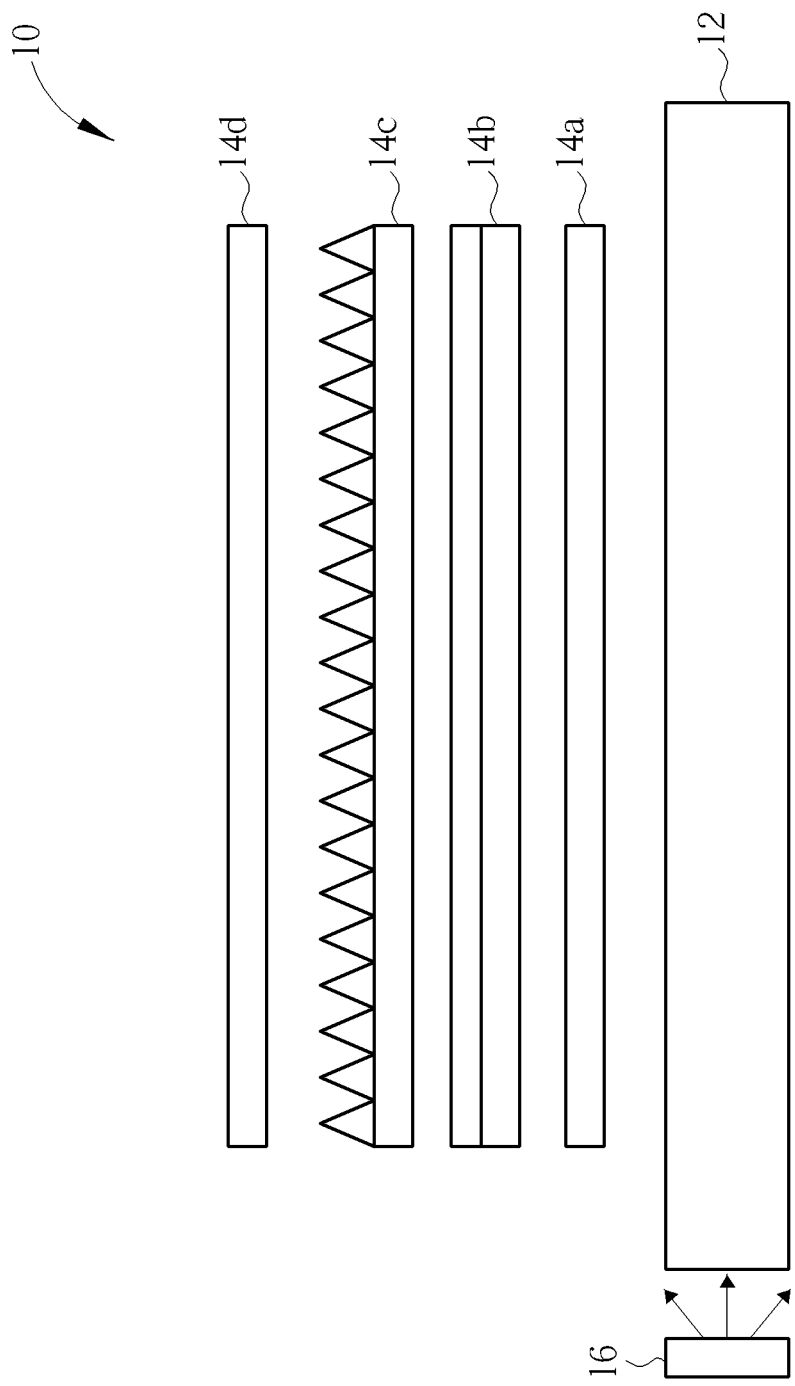
FIG. 1 is a cross-sectional view of a conventional backlight module.
Figure 2:
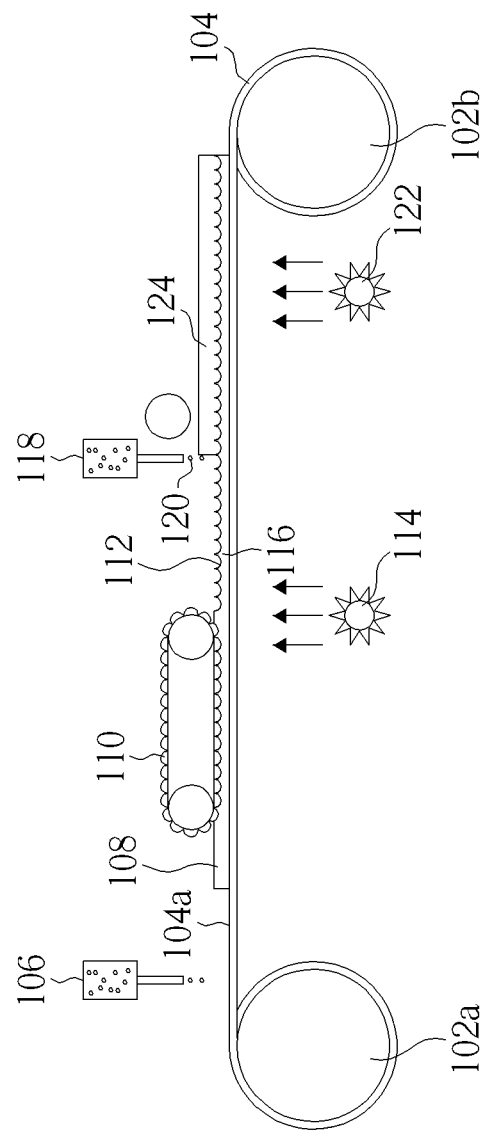
FIGS. 2-4 are method diagrams for manufacturing a composite optical film according to an embodiment of the present invention.
Figure 3:
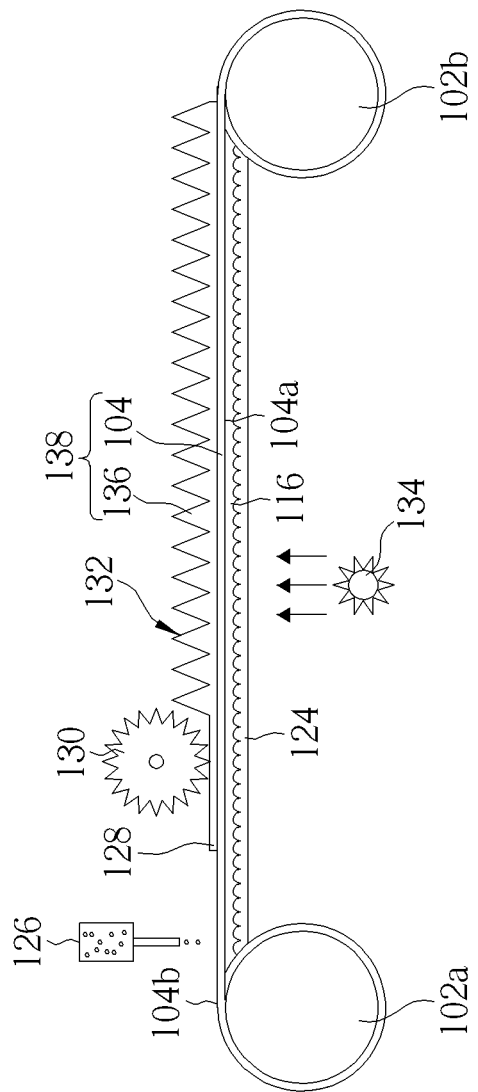
Figure 4:
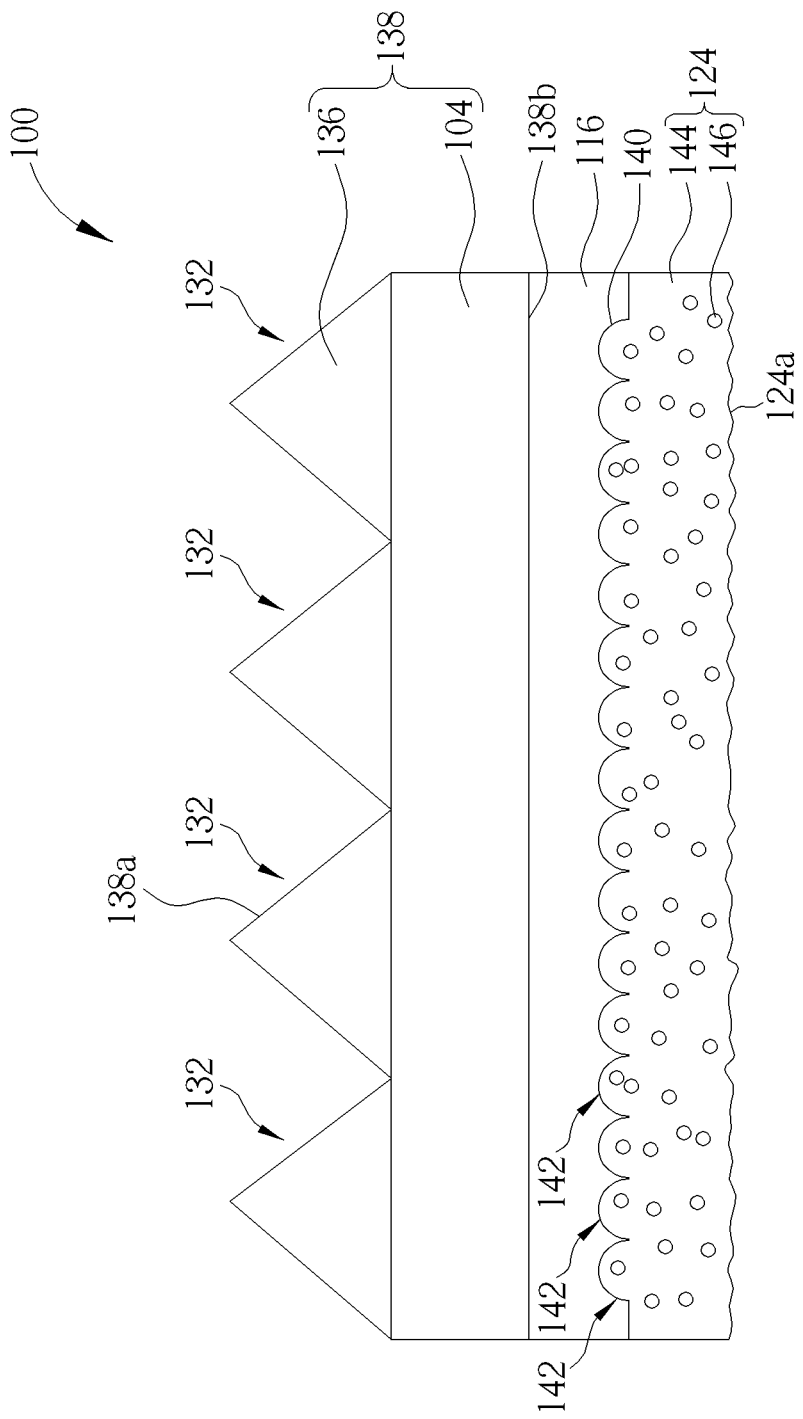

Please refer to FIGS. 2-4, which are method diagrams for manufacturing a composite optical film according to an embodiment of the present invention, wherein FIG. 4 is a cross-sectional view of a composite optical film according to an embodiment of the present invention. As shown in FIG. 2, a substrate 104 is transported continuously by a set of rollers 102a, 102b. A first surface 104a of the substrate 104 is continuously coated with a first glue 108 by a first coating tool 106. The first glue 108 is pressed by the first pressing mold 110 to form a plurality of concave surfaces 112 on the surface of the first glue 108, and the first glue 108 is solidified by a first solidifying device 114 to form an intermediate layer 116 on the first surface 104a of the substrate 104 at the same time. Thereafter, the mixing solution 120 mixed with inorganic nano-particles and the second glue is coated on the intermediate layer 116 continuously to fill each of the concave surfaces 112 by a second coating tool 118. At the same time, the mixing solution 120 is solidified by a second solidifying device 122 to form a high refractive-index layer 124 on the intermediate layer 116. The high refractive-index layer 124, which fills into the concave surfaces 112, has a plurality of convex surfaces serving as microlens.

As shown in FIG. 3, the substrate 104, the intermediate layer 116 and the high refractive-index layer 124 formed thereon are inverted and transported continuously by the set of rollers 102a, 102b. A second surface 104b of the substrate 104 opposite to the first surface 104a is continuously coated with the third glue 128 by a third coating tool 126. The third glue 128 is pressed by a second pressing mold 130 to form a plurality of first brightness enhancement structures 132 parallel to each other on the surface of the third glue 128, and the third glue 128 is solidified by a third solidifying device 134 to form a brightness enhancement part 136 on the second surface 104b of the substrate 104, thereby enabling the substrate 104 and the brightness enhancement part 136 to constitute a brightness enhancement film 138. Accordingly, the composite optical film 100 of the embodiment is completed, as shown in FIG. 4. As shown in FIG. 2-3, the first solidifying device 114, the second solidifying device 122 and the third solidifying device 134 are ultraviolet light sources, and can be utilized to solidify the first glue 108, the second glue and the third glue 128 having properties of being hardened by irradiation, but it is not limited thereto. In other embodiments, the first glue 108, the second glue and the third glue 128 may be composed of a material having properties of being hardened by heating. The first solidifying device 114, the second solidifying device 122 and the third solidifying device 134 may be heating devices that solidify the first glue 108, the second glue and the third glue 128 through heating. The methods of the first solidifying device 114, the second solidifying device 122 and the third solidifying device 134 for solidifying the first glue 108, the second glue and the third glue 128 may be any other method according to the material properties of the first glue 108, the second glue and the third glue 128.

Figure 5:
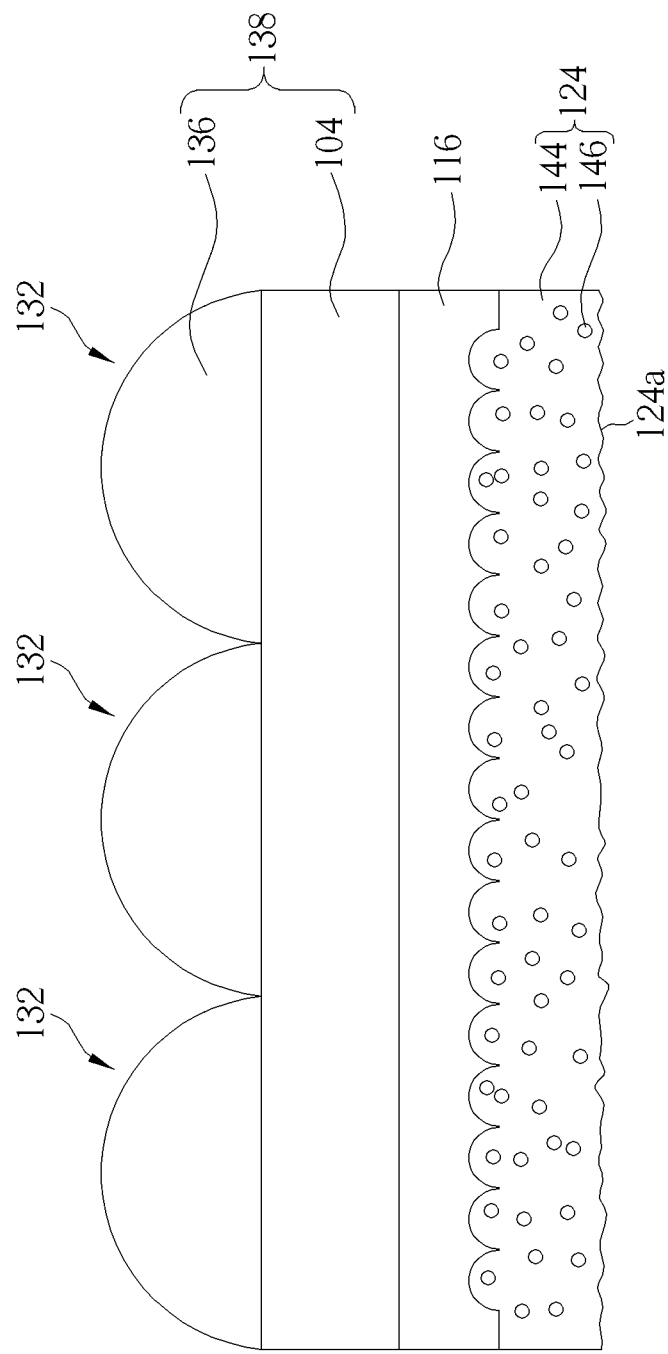
FIG. 5 is a diagram of a composite optical film according to another embodiment of the present invention.

Please refer to FIG. 4 again; the composite optical film of this embodiment is described as follows. In this embodiment, the composite optical film 100 includes the brightness enhancement film 138, the intermediate layer 116 and the high refractive-index layer 124. The brightness enhancement film 138 having a top surface 138a and a bottom surface 138b includes the substrate 104 and the brightness enhancement part 136. The brightness enhancement part 136 is located on the substrate 104, and the top surface 138a of the brightness enhancement part 136 has the first brightness enhancement structures 132 for refracting and concentrating light, which enables light to be deflected toward a direction vertical to the composite optical film 100 and then emitted out of the composite optical film 100, thereby achieving brightness enhancement. In this embodiment, the brightness enhancement part 136 may be composed of the third glue 128 (refer to FIG. 3), wherein the material of the third glue 128 may be a transparent material such as silicone, silica, polystyrene (PS), polyvinylchloride (PVC), polyethylene terephthalate (PET), polymethylmethacrylate (PMMA), but it is not limited thereto. In this embodiment, the material of the substrate 104 may be a transparent material such as PS, PVC, PET, PMMA, and the materials of the substrate 104 and the brightness enhancement part 136 are not restricted to be the same, they may be different. In this embodiment, each of the first brightness enhancement structures 132 is a micro-structure such as a prism shaped structure, but it is not limited thereto. Please refer to FIG. 5, which schematically depicts a diagram of a composite optical film according to another embodiment of the present invention. As shown in FIG. 5, in another embodiment of the present invention, the first brightness enhancement structures 132 may be semi-cylindrical shaped structures.

Moreover, as shown in FIG. 4, the high refractive-index layer 124 is disposed on the bottom surface 138b of the brightness enhancement film 138, and the intermediate layer 116 is disposed between the high refractive-index layer 124 and the brightness enhancement film 138, enabling the intermediate layer 116 and the high refractive-index layer 124 to contact each other, and the surfaces between them in contact with each other forms an interface 140. Besides, the interface 140 has a plurality of curved surfaces. In this embodiment, each of the curved surfaces is a convex surface 142, which means that the top surface of the high refractive-index layer 124 facing the brightness enhancement film 138 has a convex surface 142 protruding toward the intermediate layer 116 to serve as a microlens that will concentrate light emitted from the high refractive-index layer 124 to the intermediate layer 116 toward a direction vertical to the composite optical film 100. Each of the convex surfaces 142 may have a semi-elliptical sphere shape, a semicircular sphere shape, etc, but it is not limited thereto, and an arrangement of the convex surfaces 142 may be a matrix or a honeycomb shape. The honeycomb shape is a preferably arrangement, which enables the convex surface 142 to be arranged closest, thereby achieving a best light concentrating effect. Moreover, the bottom surface 124a of the high refractive-index layer 124 is a rough surface, so that air exists between the composite optical film 100 and the light guide plate when the composite optical film 100 and the light guide plate are assembled to be a backlight module, which helps the light emitted from the light guide plate to be concentrated and diffused by the composite optical film 100.

It is worth noting that the high refractive-index layer 124 has a first refractive index, the intermediate layer 116 has a second refractive index, the first refractive index is higher than the second refractive index, and the difference between the first refractive index and the second refractive index is greater than or equal to 0.2. Therefore, when light is emitted from the high refractive-index layer 124 toward the intermediate layer 116 and penetrates the interface 140, the light can be scattered and have a light dispersion effect, but can also be concentrated by the convex surface 142 toward the direction vertical to the composite optical film 100. In this embodiment, for enabling (the first refractive index to be 0.2 higher than the second refractive index) the first refractive index to be higher than the second refractive index and the difference between the first refractive index and the second refractive index to be greater than or equal to 0.2, the high refractive-index layer 124 includes a film 144 and a plurality of inorganic nano-particles 146 in the film 144. The film 144 has an adhesive property for bonding the high refractive-index layer 124 to the intermediate layer 116. The second glue for forming the film 144 may be composed of a transparent material such as resin, silicone, silica, PMMA, etc. Thus, the film 144 has a third refractive index that may be comprised in a range between 1.48 and 1.6. The inorganic nano-particles 146 have high refractive index and light-transmission properties, and have a fourth refractive index that may be in a range of 1.9~2.7. Accordingly, the third refractive index of the film 144 can be enhanced to be the first refractive index that is larger than the second refractive index by disposing the inorganic nano-particles 146 having the fourth refractive index into the film 144 having the third refractive index. In other words, the high refractive-index layer 124 is composed of the film 144 and the nano-particles 146, so that the first refractive index is an effective refractive index of the third refractive index combined with the fourth refractive index. Thus, by adding the inorganic nano-particles 146 into the film 144, the refractive index of the film 144 containing the inorganic nano-particles 146 can be higher than the third refractive index of the film 144 without the inorganic nano-particles 146. The refractive index (i.e. the first refractive index) of the film 144 containing the inorganic nano-particle 146 (i.e. the high refractive-index layer 124) can be adjusted by selecting the particle diameters or the materials of the added inorganic nano-particles 146. Thus, the ratio of the second refractive index of the intermediate layer 116 to the first refractive index of the high refractive-index layer 124 can be adjusted to be the same as the ratio of the refractive index of the air to the refractive index of the diffuser of the prior art. Accordingly, the light emitting from the high refractive-index layer 124 having the first refractive index to the intermediate layer 116 having the second refractive index will be diffused, and generate a light dispersion effect. Furthermore, since the difference between the second refractive index and the first refractive index is larger, the light dispersion effect is better. In order to obtain a larger difference between the second refractive index and the first refractive index, the inorganic nano-particles 146 having a high refractive index can be added into the film 144 having a low refractive index, enabling the high refractive-index layer 124 to have more properties of high refractive index from the inorganic nano-particles 146. Accordingly, the probability for light to emit through the inorganic nano-particles 146 is increased, and the difference of the refractive index in the interface 140 can be enhanced, and the effect of light diffusing and concentrating can be more obvious. In this embodiment, the ratio of the volume of inorganic nano-particles 146 to the volume of the high refractive-index layer 124 is in a range of 20%~80%. However, as the ratio of the inorganic nano-particles 146 to the film 144 is larger than a specific value, the inorganic nano-particles 146 tend to agglomerate without being uniformly distributed in the film 144, which leads the high refractive-index layer 124 to have the adhesive characteristics of the film 144, thereby rendering the high refractive-index layer 124 to be easy to be peel off the intermediate layer 116. Thus, in this embodiment, the ratio of the volume of inorganic nano-particles 146 to the volume of the high refractive-index layer 124 is preferred to be comprised in a range from 50% to 60%, so that the inorganic nano-particles 146 can be arranged closely. Moreover, each of the inorganic nano-particles 146 has a particle diameter smaller than 100 nanometer (nm) in this embodiment. Since the inorganic nano-particles 146 have sizes in the range of a few nanometer (nm), they are therefore smaller than the shortest wavelength (i.e. 380 nanometer (nm)) of the visible light. When the particle diameter is much larger than the light wavelengths, the light easily propagates back and forth between the particles to be diffused, so that the energy of the light is easily absorbed while diffusing. The energy loss of light due to being absorbed while diffusing can be effectively prevented by the inorganic nano-particles 146 in this embodiment. Also, the inorganic nano-particles 146 only changes light propagation direction, but do not provide the diffusion effect to the light. Accordingly, light passing through the high refractive-index layer 124 is almost not scattered and nor absorbed, thereby maintaining a high light utilization ratio. Moreover, the particle diameters of the inorganic nano-particles 146 are preferred to be as small as possible to avoid light being scattered by the inorganic nano-particles 146, and reduce the energy loss of the light passing through the high refractive-index layer 124. The material for forming the inorganic nano-particle 146 may be an inorganic material such as Titanium dioxide ($TiO_2$), Chromium dioxide ($CrO_2$), Indium Tin Oxide (ITO) or Zinc Oxide (ZnO), but it is not limited thereto. Different materials for the inorganic nano-particles 146 will induce different fourth refractive indexes. Thus, the first refractive index can be controlled by selecting the material of the inorganic nano-particles 146, or adjusting the sizes/numbers of the particle diameters or the ratio of the volume the inorganic nano-particles 146 to the volume of the high refractive-index layer 124.

Moreover, the first glue 108 forming the intermediate layer 116 may be a transparent material such as silicone, silica, PS, PVC, PET, PMMA, but it is not limited thereto. The second refractive index can be comprised in a range between 1.48 and 1.6. It is emphasized that when the high refractive-index layer 124 is composed of the film 144 with no inorganic nano-particles 146, the refractive index of the high refractive-index layer 124 is just in a range of 1.48~1.6, but the difference between the refractive index of the high refractive-index layer 124 and the second refractive index of the intermediate layer 116 can therefore not be greater than or equal to 0.2. In order to solve this problem, by disposing the inorganic nano-particles 146 are disposed into the film 144 in this embodiment to enhance the first refractive index of the high refractive-index layer 124 to be greater than the second refractive index and the difference between the first refractive index and the second refractive index to be larger than or equal to 0.2. This way, the ratio of the second refractive index of the intermediate layer 116 to the first refractive index of the high refractive-index layer 124 can be adjusted to be common to the ratio of the refractive index of the air to the refractive index of the diffuser of the prior art. Thus, the relation curve of the light incident angle versus the light penetration rate, the relation curve of light incident angle versus the light reflection rate, and the relation curve of light incident angle versus the light refraction angle as the light penetrates the interface 140 in the composite optical film 100 can be respectively the same as the relation curve of the light incident angle versus the light penetration rate, the relation curve of light incident angle versus the light reflection rate, and the relation curve of light incident angle versus the light refraction angle as the light emits from the diffuser of the prior art to the air. This way, the composite optical film 100 of this embodiment can integrate the brightness enhancement plate and the diffuser of the prior art as one optical film, so that the process steps and process time of assembling the backlight module can be saved and scratches and damages between the brightness enhancement plate and the diffuser can be avoided.

The composite optical film of the present disclosure is not restricted to said embodiment. Other embodiments are presented in the following. To simplify and highlight the differences between different embodiments, same symbols are used for same components, and same parts of these embodiments are not described again.

Figure 6:
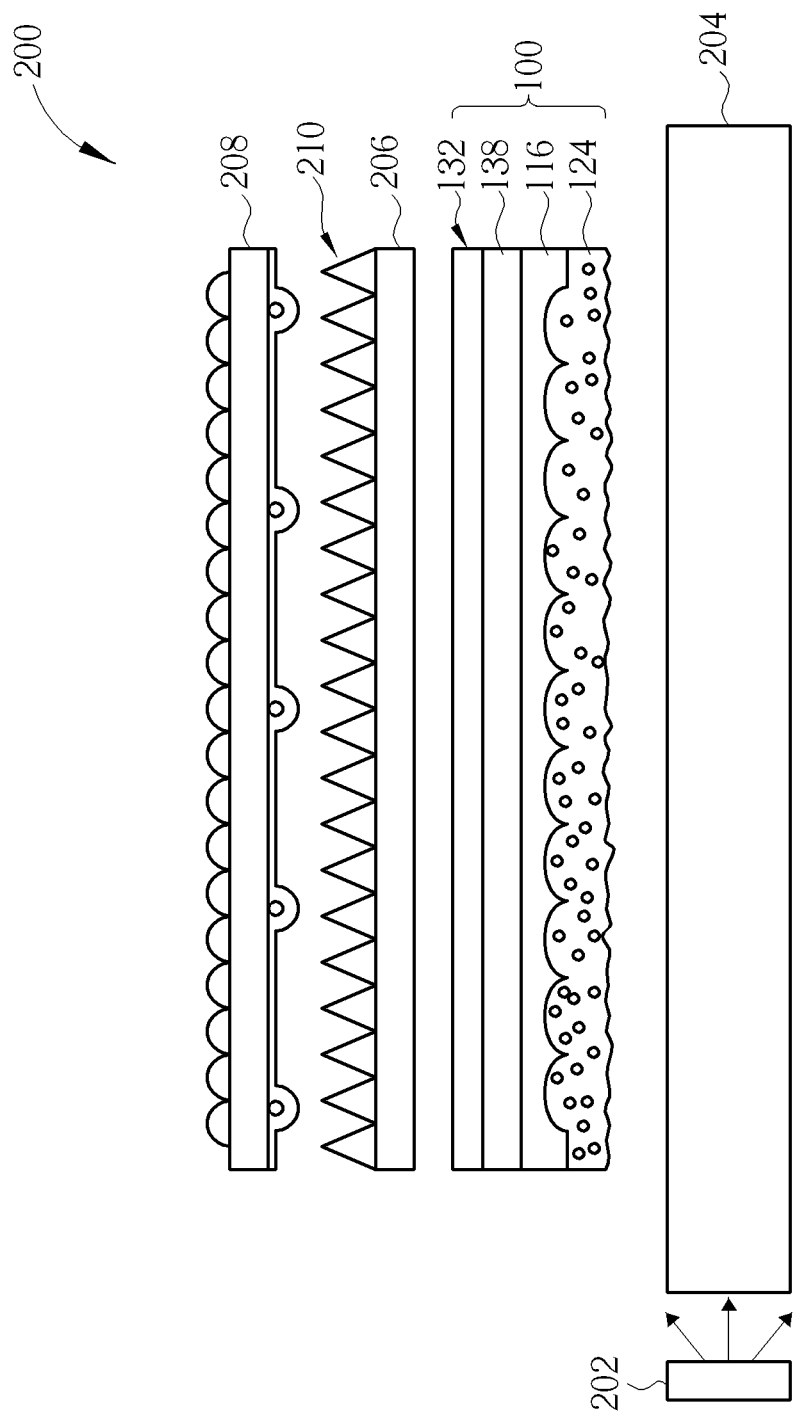
FIG. 6 is a cross-sectional view of a backlight module according to a first embodiment of the present invention.

A backlight module using the composite optical film of said embodiment is presented in the following. FIG. 6 schematically depicts a cross-sectional view of a backlight module according to a first embodiment of the present invention. As shown in FIG. 6, apart from the composite optical film 100, the backlight module 200 of this embodiment further includes a light source 202, a light guide plate 204, a brightness enhancement plate 206 and a diffuser 208, and the backlight module 200 can be used in a display device of a portable electronic device, but it is not limited thereto. The light source 202 is disposed on a sidewall of the light guide plate 204, and the light generated by the light source 202 is emitted into the light guide plate 204 from the sidewall of the light guide plate 204. The composite optical film 100 is disposed on the light guide plate 204 to receive the light emitted from the top surface of the light guide plate 204 and to diffuse and concentrate the light, wherein the light is emitted into the composite optical film 100 from the high refractive-index layer 124 and is emitted out from the top surface of the composite optical film 100. The diffuser 208 is disposed on the composite optical film 100, and the brightness enhancement plate 206 is disposed between the diffuser 208 and the composite optical film 100. Moreover, the brightness enhancement plate 206 has a plurality of second brightness enhancement structures 210 parallel to each other, and the second brightness enhancement structures 210 are perpendicularly to the first brightness enhancement structures 132 of the composite optical film 100. This way, light emitted from the top surface of the light guide plate 204 can be concentrated toward a direction vertical to the composite optical film 100 respectively by the first brightness enhancement structures 132 and the second brightness enhancement structures 210. Thus, only the composite optical film 100, one diffuser and one brightness enhancement plate are needed in the backlight module 200 of this embodiment to achieve the optical performance of the lower diffuser, the lower brightness enhancement plate, the upper brightness enhancement plate and the upper diffuser of the prior art, thereby saving process steps and time and process costs for assembling, and reducing the thickness of the backlight module. Moreover, in another embodiment, the light source may be a light-emitting device such as a Cold Cathode Fluorescent Lamp (CCFL), and is a direct type backlight module. The light guide plate is selectively used.

Figure 7:
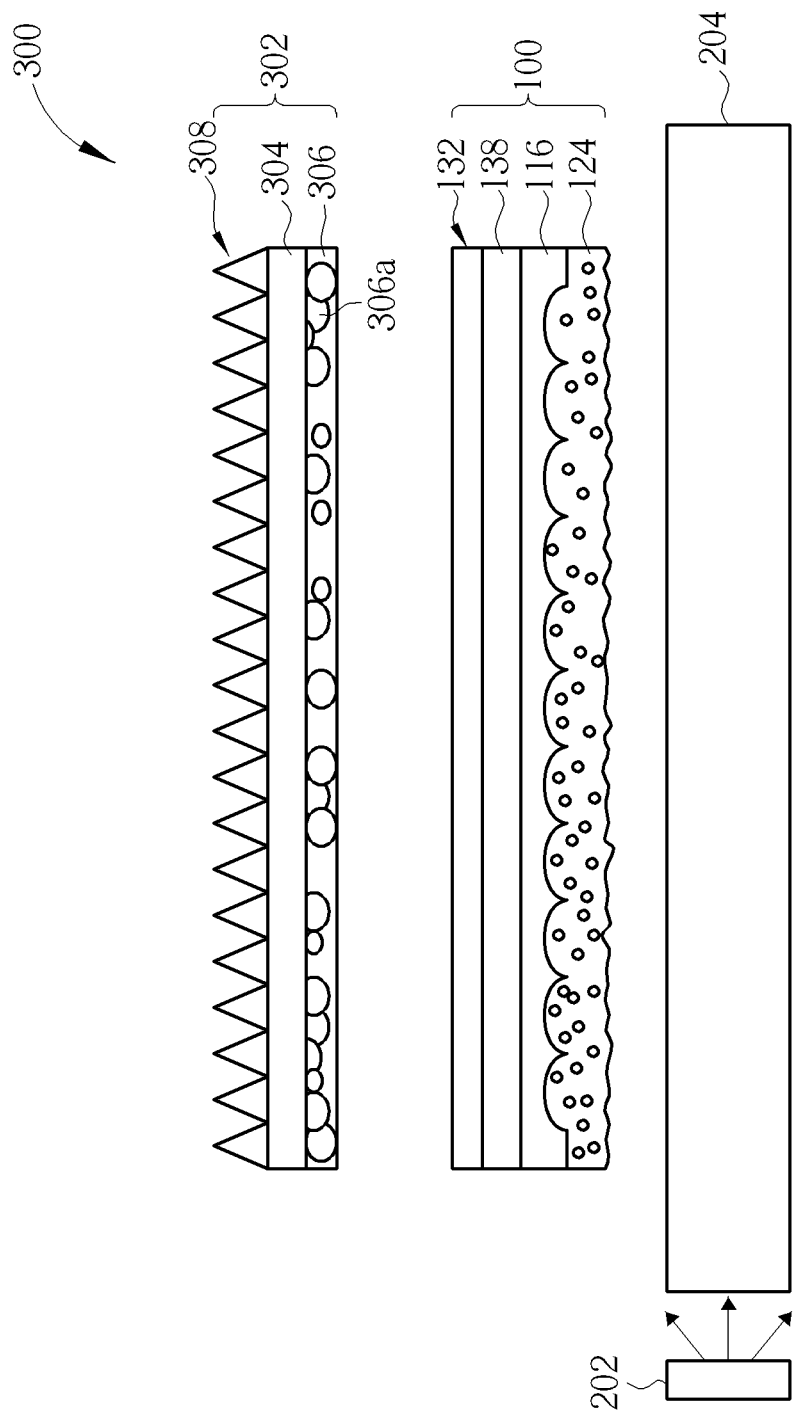
FIG. 7 is a cross-sectional view of a backlight module according to a second embodiment of the present invention.

Please refer to FIG. 7, which schematically depicts a cross-sectional view of a backlight module according to a second embodiment of the present invention. As shown in FIG. 7, compared to the backlight module in the first embodiment, the backlight module 300 in this embodiment integrates the brightness enhancement plate and the diffuser as a multi-functional brightness enhancement plate 302 disposed on the composite optical film 100, and the multi-functional brightness enhancement plate 302 includes a transparent substrate 304 and a coating layer 306 disposed under the transparent substrate 304. The coating layer 306 further includes a plurality of diffusing particles 306a disposed therein to fully disperse light and transform the light into an uniform planar light source. Moreover, the top surface of the multi-functional brightness enhancement plate 302 has a plurality of second brightness enhancement structures 308 parallel to each other, and the second brightness enhancement structures 308 are perpendicular to the first brightness enhancement structures 132, so that light can be concentrated toward the direction vertical to the composite optical film 100. Thus, only the composite optical film 100 and the multi-functional brightness enhancement plate 302 are needed in the backlight module of this embodiment to achieve the optical performance of the lower diffuser, the lower brightness enhancement plate, the upper brightness enhancement plate and the upper diffuser of the prior art, thereby saving process steps and time and process costs for assembling, and reducing the thickness of the backlight module.

Figure 8:
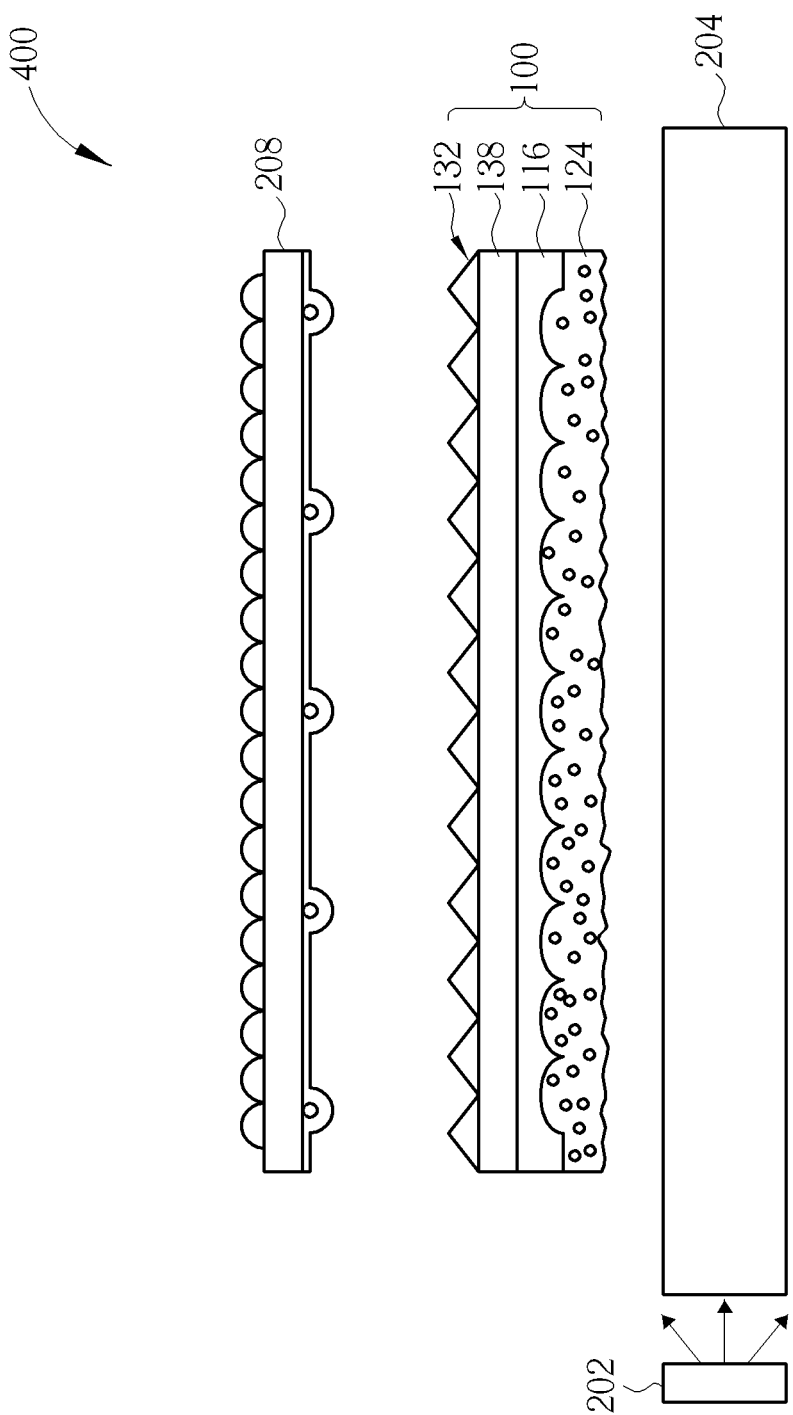
FIG. 8 is a cross-sectional view of a backlight module according to a third embodiment of the present invention.

Please refer to FIG. 8, which schematically depicts a cross-sectional view of a backlight module according to a third embodiment of the present invention. As shown in FIG. 8, compared to the backlight module of the first embodiment, the backlight module 400 of this embodiment only includes the diffuser without having the brightness enhancement plate being disposed, so that the backlight module 400 can be a backlight module of a desktop display device.

To summarize, the present disclosure enhances the third refractive index of the film up to the first refractive index of the high refractive-index layer by disposing inorganic nano-particles having a fourth refractive index in the film having the third refractive index, so that the ratio of the second refractive index of the intermediate layer and the first refractive index of the high refractive-index layer can be adjusted to be the same as the ratio of the refractive index of the air and the refractive index of the lower diffuser of the prior art. This way, the composite optical film of the present disclosure can not only achieve the optical performance of combining the brightness enhancement plate and the diffuser, but also save process steps and process time for assembling the backlight module. Moreover, the composite optical film of the present invention can prevent scratching and damages to occur between the brightness enhancement plate and the diffuser, and reduce the thickness of the backlight module using said composite optical film.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A composite optical film, comprising:
   a brightness enhancement film having a top surface and a bottom surface opposite to each other, and the top surface of the brightness enhancement film having a plurality of brightness enhancement structures parallel to each other;
   a high refractive-index layer disposed below the bottom surface and including a film and a plurality of inorganic nano-particles disposed within the film; and
   an intermediate layer disposed between the brightness enhancement film and the high refractive-index layer, wherein the high refractive-index layer has a first refractive index, the intermediate layer has a second refractive index, the first refractive index is higher than the second refractive index, and a difference between the first refractive index and the second refractive index is greater than or equal to 0.2, wherein a top surface of the high refractive-index layer facing the intermediate layer and a bottom surface of the intermediate layer are conformally in contact with each other to form an interface, and the interface has a plurality of convex surfaces.

2. The composite optical film according to claim 1, wherein the inorganic nano-particles comprise Titanium dioxide ($TiO_2$), Chromium dioxide ($CrO_2$), Indium Tin Oxide (ITO) or Zinc Oxide (ZnO).

3. The composite optical film according to claim 1, wherein each of the inorganic nano-particles has a particle diameter, and the particle diameter is less than 100 nanometers (nm).

4. The composite optical film according to claim 1, wherein the film comprises resin.

5. The composite optical film according to claim 1, wherein a ratio of a volume of the inorganic nano-particles to a volume of the high refractive index layer is in a range of 20%~80%.

6. The composite optical film according to claim 1, wherein a top surface of the high refractive-index layer facing the brightness enhancement film has a plurality of convex surfaces.

7. The composite optical film according to claim 6, wherein the convex surfaces are arranged in a honeycomb shape.

8. The composite optical film according to claim 1, wherein a bottom surface of the high refractive-index layer is a rough surface.

9. A backlight module, comprising:
a light guide plate having a light entrance surface and a light exit surface;
a light source disposed at a side of the light entrance surface of the light guide plate; and
a composite optical film disposed on the light exit surface of the light guide plate, and the composite optical film comprising:
a brightness enhancement film having a top surface and a bottom surface opposite to each other, and the top surface of the brightness enhancement film having a plurality of first brightness enhancement structures parallel to each other;
a high refractive-index layer disposed below the bottom surface comprising a film and a plurality of inorganic nano-particles disposed within the film, wherein the high refractive-index layer has a first refractive index; and
an intermediate layer disposed between the brightness enhancement film and the high refractive-index layer, wherein a light emits into the composite optical film from the high refractive-index layer and emits out of the composite optical film from the top surface of the composite optical film, wherein the intermediate layer has a second refractive index, the first refractive index is higher than the second refractive index, and a difference between the first refractive index and the second refractive index is greater than or equal to 0.2, wherein each of the inorganic nano-particles has a particle diameter, and the particle diameter is less than 100 nanometers, wherein a top surface of the high refractive-index layer facing the intermediate layer and a bottom surface of the intermediate layer are conformally in contact with each other to form an interface, and the interface has a plurality of convex surfaces.

10. The backlight module according to claim 9, further comprising a diffuser disposed on the composite optical film.

11. The backlight module according to claim 9, further comprising a brightness enhancement plate disposed between the diffuser and the composite optical film.

12. The backlight module according to claim 11, wherein the brightness enhancement plate has a plurality of second brightness enhancement structures parallel to each other, and the second brightness enhancement structures are perpendicularly to the first brightness enhancement structures.

13. A composite optical film, comprising:
an intermediate layer;
a high refractive-index layer having a plurality of inorganic nano-particles, and the high refractive-index layer being disposed on the intermediate layer; and
an interface between the intermediate layer and the high refractive-index layer, the interface being formed by a top surface of the high refractive-index layer facing the intermediate layer and a bottom surface of the intermediate layer, and the top surface of the high refractive-index layer and the bottom surface of the intermediate layer being conformally in contact with each other, wherein the interface has a plurality of convex surfaces, wherein the high refractive-index layer has a first refractive index, the intermediate layer has a second refractive index, the first refractive index is higher than the second refractive index, and a difference between the first refractive index and the second refractive index is greater than or equal to 0.2.

14. The composite optical film according to claim 13, further comprising a plurality of brightness enhancement structures disposed on the intermediate layer, wherein the intermediate layer is disposed between the brightness enhancement structures and the high refractive-index layer.

15. The composite optical film according to claim 13, wherein the inorganic nano-particles have light-transmission properties.

16. The composite optical film according to claim 13, wherein a refractive index of the inorganic nano-particles is in the range of 1.9~2.7.

* * * * *